A. J. KREUZKAMP.
SPRING STRUCTURE.
APPLICATION FILED JAN. 9, 1919.
1,372,702. Patented Mar. 29, 1921.
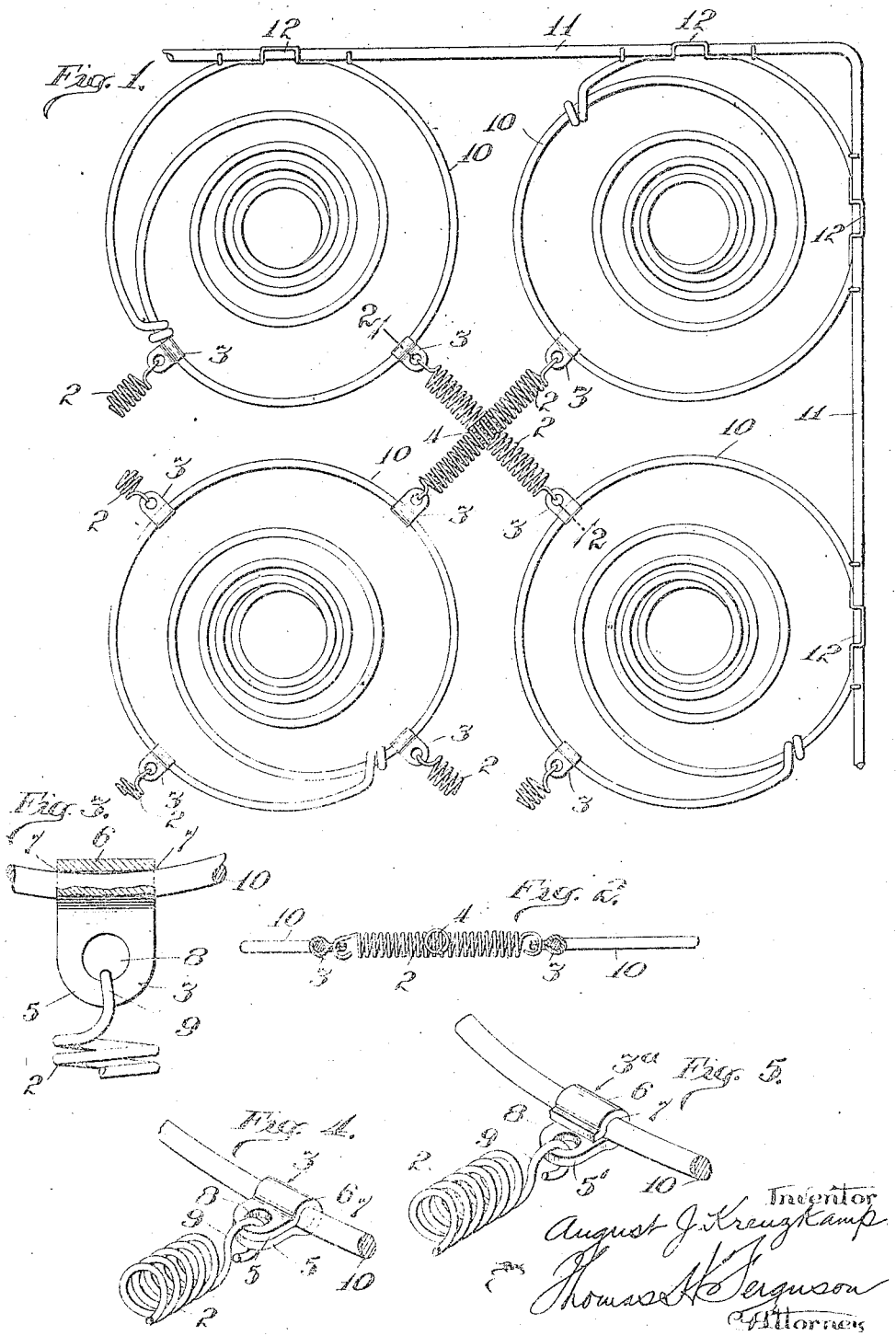

UNITED STATES PATENT OFFICE.

AUGUST J. KREUZKAMP, OF CHICAGO, ILLINOIS, ASSIGNOR TO ENGLANDER SPRING BED COMPANY, OF NEW YORK, N. Y., A CORPORATION OF NEW YORK.

SPRING STRUCTURE.

1,372,702.

Specification of Letters Patent.   Patented Mar. 29, 1921.

Application filed January 9, 1919. Serial No. 270,261.

*To all whom it may concern:*

Be it known that I, AUGUST J. KREUZKAMP, a citizen of the United States, residing at Chicago, in the county of Cook, State of Illinois, have invented certain new and useful Improvements in Spring Structures, of which the following is a specification.

The present invention relates to spring structures of the class used in bed bottoms, sofas, cushions and the like. The principal object of the invention is to provide a structure of this class which will be simple, efficient in operation and economical to manufacture. In carrying out my invention I employ coiled bed springs in association with small coiled interconnecting springs and improved connecting means for attaching the small springs to the bed springs. This connecting means is in the form of a clip which is secured to the small spring and to the wire of a coil of a bed spring in such a way as to hold the parts against slipping. This latter function is preferably accomplished by constructing the clip so that it bites into the wire of the coil. The character of the invention will be more fully understood upon reference to the following detailed description taken in connection with the accompanying drawing, while the scope of the invention will be particularly pointed out in the appended claims.

In said drawing, Figure 1 is a plan view of a portion of a bed bottom having a spring structure formed in accordance with the present invention; Fig. 2 is a partial sectional elevation, the plane of section being indicated by the line 2—2 of Fig. 1; Fig. 3 is a partial sectional plan view of a connector showing the manner in which the ends of the same bite into the wire of the coil upon which it is located; Fig. 4 is a perspective view illustrating one form of connector; and Fig. 5 is a similar view illustrating a modified form of connector. Throughout these views, like characters refer to like parts.

Referring to the drawing in detail, the bed bottom structure illustrated comprises a plurality of bed springs 10 arranged in longitudinal and transverse rows. These springs are of the usual double helical formation and the end coils of the springs around the edges of the structure are connected to a binding wire 11 by suitable wire fasteners 12. The various springs 10 are interconnected and held in spaced relation by small coiled springs 2, associated with connectors 3. Each end of each spring 2 is provided with such a connector and the springs 2 are maintained under tension. The springs 2 are here shown as disposed diagonally although they might be otherwise disposed if desired. At the point of crossing, springs 2 are interwoven as indicated at the point 4. Each of the connectors is preferably composed of a flat strip of sheet metal bent to form a tubular portion and a flat extended portion. In the form of the invention illustrated in Fig. 4, the flat portion comprises two leaves and in the form of the invention illustrated in Fig. 5 each comprises but a single leaf 5'. In each form, the tubular portion 6 is rectilinear and by engagement with the curved wire of the end coil of the spring 10 with which it is associated, bites into the metal of the latter at the points 7, located at its ends, and thus prevents slippage between the connector and the wire of the spring 10. This action is present in both forms of the clip, whether that of Fig. 4, designated 3, or that of Fig. 5, designated 3ª. The extended portion of the clip is provided in each form with a perforation 8. A hook 9 upon the end of the small coiled spring 2 associated with the particular connector in question passes through the perforation 8 as clearly illustrated. In the assembling of the parts the springs 2 are stretched when connecting the hooks 9 to the connectors and are thus maintained under tension. In assembling the parts the connectors are first made U-shape so that they can be slipped over the wire of the end coil of the bed spring. When thus slipped over they are brought to the desired point of attachment and then by a suitable compressing tool the parts are forced together to provide the tubular portion 6 and the flat extended portion. The same method of attachment is, of course, applicable to both clips 3 and 3ª.

By the construction herein disclosed, I am able to provide a durable spring structure which may be adapted for use in various places. When used in a bed bottom, as here disclosed, the various bed springs 10 are firmly, yet yieldingly held and the connectors will not slip along the wire of the bed springs and so will maintain the application of the tension of the springs 2 at the proper points. The structure is also simple and avoids crimping the wires of the bed spring at points as is sometimes done in the construction of prior art structures. The fixity of the connectors also makes the entire structure relatively noiseless when in use. These and other advantages of the structure will be apparent to those skilled in the art without further representation. The small coiled springs and associated connectors may, of course, be connected to other than the end coils of the bed springs and the same may be used to connect bed springs to other parts. All of these applications and others not enumerated will readily occur to persons skilled in this art.

What I claim as new and desire to secure by Letters Patent of the United States, is:

1. A spring structure comprising a plurality of coiled bed springs, small coiled springs extending beween said bed springs, and connectors for connecting said small springs to said bed springs, each connector comprising a rectilinear tubular portion and an extended portion, said extended portion extending outward from the bed spring and having means for attaching the end of the small spring, said rectilinear tubular portion embracing the curved wire of one of the coils of the bed spring, that portion of the curved wire within said tubular portion having the same degree of curvature throughout and the ends of said tubular portion on the opposite side of said wire from said extended portion biting into the inner surface of said wire to hold the connector against slipping.

2. A spring structure comprising a plurality of coiled bed springs, small coiled springs extending between said bed springs, and connectors for connecting said small springs to said bed springs, each connector comprising a wire-embracing portion and an extended portion, said extended portion extending outward from the bed spring and having means for attaching the end of the small spring, said wire-embracing portion embracing a portion of the wire of one of the coils of the bed spring which has the same degree of curvature throughout its embraced portion, said wire-embracing portion being provided with biting edges for engaging the inner surface of said wire at points some distance apart to bite into said wire to hold the connector from slipping on the wire.

In testimony whereof, I hereunto subscribe my name this 7th day of January, A. D. 1919.

AUGUST J. KREUZKAMP.